(12) United States Patent
Yeakley et al.

(10) Patent No.: US 7,646,558 B2
(45) Date of Patent: Jan. 12, 2010

(54) POSITIONING SYSTEM AND METHOD FOR A TRANSDUCER HEAD

(75) Inventors: Darryl W. Yeakley, Erie, CO (US); William J. Vanderheyden, Loveland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 444 days.

(21) Appl. No.: 11/625,927

(22) Filed: Jan. 23, 2007

(65) Prior Publication Data

US 2008/0174904 A1  Jul. 24, 2008

(51) Int. Cl.
*G11B 15/12* (2006.01)
(52) U.S. Cl. .................... 360/63; 360/75; 360/78.02
(58) Field of Classification Search .................. None
See application file for complete search history.

(56) References Cited

U.S. PATENT DOCUMENTS

| | | | |
|---|---|---|---|
| 3,781,490 A * | 12/1973 | Phillips | 360/78.02 |
| 5,432,652 A * | 7/1995 | Comeaux et al. | 360/77.12 |
| 5,793,574 A | 8/1998 | Cranson et al. | |
| 5,818,668 A | 10/1998 | Gonzales | |
| 5,898,533 A * | 4/1999 | Mantey et al. | 360/77.12 |
| 5,926,339 A * | 7/1999 | Mantey et al. | 360/78.02 |
| 5,946,156 A * | 8/1999 | Schwarz et al. | 360/78.02 |
| 5,949,619 A | 9/1999 | Eckberg et al. | |
| 6,005,737 A * | 12/1999 | Connolly et al. | 360/78.02 |
| 6,594,118 B1 | 7/2003 | Nayak et al. | |
| 6,724,561 B1 * | 4/2004 | Wyman | 360/77.12 |
| 6,970,314 B2 * | 11/2005 | Watson et al. | 360/53 |
| 6,985,430 B1 | 1/2006 | Villiard et al. | |

* cited by examiner

*Primary Examiner*—Hoa T Nguyen
*Assistant Examiner*—James L Habermehl
(74) *Attorney, Agent, or Firm*—Brooks Kushman P.C.

(57) ABSTRACT

In one embodiment of a system and method for positioning a transducer head, the transducer head includes a first group of elements for reading data from or writing data to a set of tracks on a storage medium, and a second group of elements for reading data from or writing data to a set of tracks on a storage medium. A device supplies electrical power to the first group of elements to read data from or write data to a first position on the storage medium, and supplies electrical power to the second group of elements to read data from or write data to a second position on the storage medium different than the first position without coarse movement of the transducer head relative to the storage medium.

20 Claims, 3 Drawing Sheets

POSITIONING SYSTEM AND METHOD FOR A TRANSDUCER HEAD

TECHNICAL FIELD

The following relates to a system and method for positioning of a transducer head for reading data from or writing data to a magnetic tape storage medium.

A detailed description and accompanying drawings are set forth below.

DETAILED DESCRIPTION

With reference to the Figures, a more detailed description of exemplary embodiments of a transducer head positioning system and method and various components thereof will now be provided.

Figure 1A:
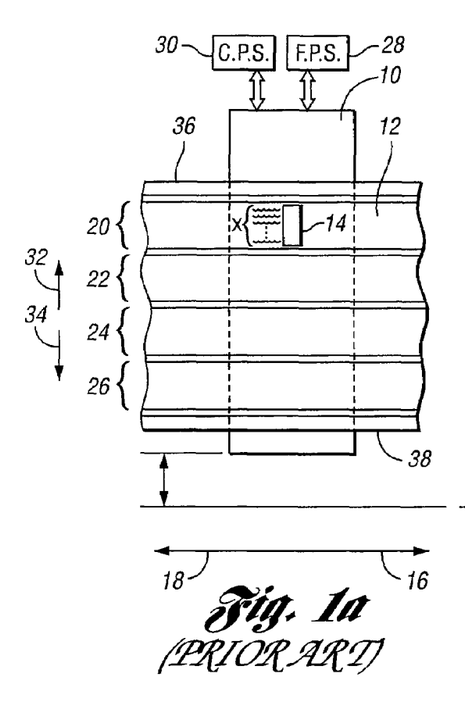
FIGS. 1a and 1b are simplified, exemplary block diagrams depicting a prior art transducer head positioning system.
Figure 1B:
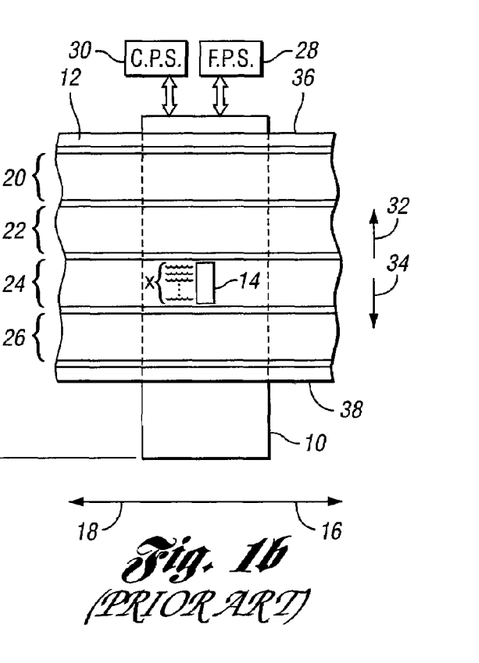

Referring first to FIGS. 1a and 1b, simplified, exemplary block diagrams depicting a prior art transducer head positioning system are shown. As seen therein, a transducer head (10) and a magnetic tape (12) storage medium function in a fashion well known in the art to store and retrieve information in the form of data.

The transducer head (10) includes a group of transducer elements (14). As is well known in the art, the group of transducer elements (14) may include any number of individual transducer elements (not shown). Such individual transducer elements may be write elements for writing data to the magnetic tape (12). Alternatively, such individual transducer elements may be read elements for reading data from the magnetic tape (12). The group of transducer elements (14) may also include both read and write elements for reading data from and writing data to the magnetic tape (12). For example, the group of transducer elements (14) may be a well known "two-bump" arrangement comprising a row of 16 write elements with a parallel row of 16 read elements adjacent thereto, such that data written to the magnetic tape by a write element may be immediately read by the adjacent read element in order to check for errors. It should be noted that the transducer head (10), including the individual transducer elements of the group of transducer elements (14), may be fabricated by any known processes, such as, for example, thin-film deposition processes.

In order for the transducer head (10) to read data from and/or write data to the magnetic tape (12), the magnetic tape (12) moves across the transducer head (10) in either of the general directions shown by the arrows (16, 18). As the magnetic tape (12) moves in either of the directions (16, 18), the group of transducer elements (14) may be operated to read data from and/or write data to the magnetic tape (12) at a first position (20) on the magnetic tape (12). In that regard, the group of transducer elements (14) operate to read data from and/or write data to a plurality of tracks, which may be referred to as data tracks (x), at the first position (20) on the magnetic tape (12).

As is well known in the art, there are a plurality of positions on the magnetic tape (12) at which data may be read from and/or written to as the magnetic tape (12) moves relative to the transducer head (10). As seen in FIGS. 1a and 1b, in addition to the first position (20) on magnetic tape (12), second position (22), third position (24) and fourth position (26) are shown. While FIGS. 1a and 1b depict four media positions at which data may be read from or written to the magnetic tape (12), those of ordinary skill will recognize that any number of such media positions may be provided on the magnetic tape (12) depending on a number of factors, among which are, for example, the size of the transducer head (10), the size and number of individual transducer elements (not shown) in the group of transducer elements (14), and the width of the magnetic tape (12).

In order to prevent errors in reading data from and/or writing data to the magnetic tape (12) by the group of transducer elements (14) of the transducer head (10), proper alignment (e.g., azimuth and zenith) of the group of transducer elements (14) relative to the first position (20) on the magnetic tape (12) is required. In order to maintain proper alignment between the individual transducer elements (not shown) of the group of transducer elements (14) and the data tracks of the first position (20) on the magnetic tape (12), a fine positioning system (28) may be provided to effect relatively small movement of the transducer head (10), and thus the group of transducer elements (14), relative to the first position (20) on the magnetic tape (12). Such movement of the transducer head (10) by the fine positioning system (28) may be in either of the general directions shown by the arrows (32, 34) in FIGS. 1a and 1b. The fine positioning system (28) may be any type of system known in the art for such relatively small scale movement of the transducer head (10). Such systems may include a flexure, such as a leaf spring, driven by a voice coil linear motor.

In order for the group of transducer elements (14) to read data from and/or write data to data tracks at a position on the magnetic tape (12) other than the first position (20), the transducer head (10) may be re-positioned relative to the magnetic tape (12). As seen in FIG. 1b, in order to effect such relatively large scale movement, a coarse positioning system (30) may be provided to move or re-position the transducer head (10). The coarse positioning system (30) may be any type of system known in the art for such coarse positioning of the transducer head (10), such as rail and bearing or ball and track systems driven by a stepper motor, or a flexure driven by a voice coil linear motor.

Referring still to FIG. 1b, the coarse positioning system (30) moves the transducer head (10), and thus the group of transducer elements (14), relative to the magnetic tape (12). In such a fashion, the group of transducer elements (14) may be re-positioned such that the group of transducer elements (14) may be operated to read data from and/or write data to a set of data tracks at a position on the magnetic tape (12), shown in FIG. 1b as the third position (24), other than the first position (20). Such movement of the transducer head (10) by the coarse positioning system (30) may be in either of the general directions shown by arrows (32, 34). As is well known in the art, additional movement of the transducer head (10) by the coarse positioning system (30) may be employed to re-position the group of transducer elements (14) such that the group of transducer elements (14) may be operated to read data from and/or write data to data tracks at either of the second position (22) or the fourth position (26) on the magnetic tape (12).

As can be seen, with the four media positions (20, 22, 24, 26) on the magnetic tape (12) depicted in FIGS. 1a and 1b, the transducer head (10) must be moved or re-positioned three times by the coarse positioning system (30) relative to the magnetic tape (12) in order for the group of transducer elements (14) to read data from and/or write data to all of the media positions (20, 22, 24, 26) on the magnetic tape (12). Moreover, to read data from and/or write data to all of the media positions (20, 22, 24, 26), the transducer head (10) must be moved by the coarse positioning system (30) between four positions, where the maximum distance of travel is the distance between the outermost media positions (20, 26) on the magnetic tape (12). As previously described, at any media position (20, 22, 24, 26) on the magnetic tape (12), the fine positioning system (28) functions to provide relatively small scale movement or re-positioning of the transducer head (10) relative to the magnetic tape (12) in order to maintain proper alignment between the group of transducer elements (14) and the data tracks at such media positions (20, 22, 24, 26).

As is also well known in the art, to further prevent errors in reading data from and/or writing data to various media positions (20, 22, 24, 26) on the magnetic tape (12), the transducer head (10) may be provided with sufficient width such that the transducer head (10) extends (in the direction of arrows (32, 34) in FIGS. 1a and 1b) beyond both edges (36, 38) of the magnetic tape (12) regardless of the position of the transducer head (10) relative to the magnetic tape (12). That is, whatever the position of the transducer head (10) effected by the coarse positioning system (30) such that the group of transducer elements (14) may be operated to read data from and/or write data to data tracks at the various media positions (20, 22, 24, 26) on the magnetic tape (12), the transducer head (10) extends beyond the edges (36, 38) of the magnetic tape (12). As can be seen, the transducer head (10) is therefore provided with a width significantly greater than the width of the magnetic tape (12), thereby increasing the amount of material used to construct the transducer head (10), as well as the resulting mass of the transducer head (10) that must be actuated by the fine and coarse positioning systems (28, 30). As is readily apparent, both the fine and the coarse positioning systems (28, 30) are designed to account for and accurately move the transducer head (10) with such a resulting actuated mass.

Figure 2A:
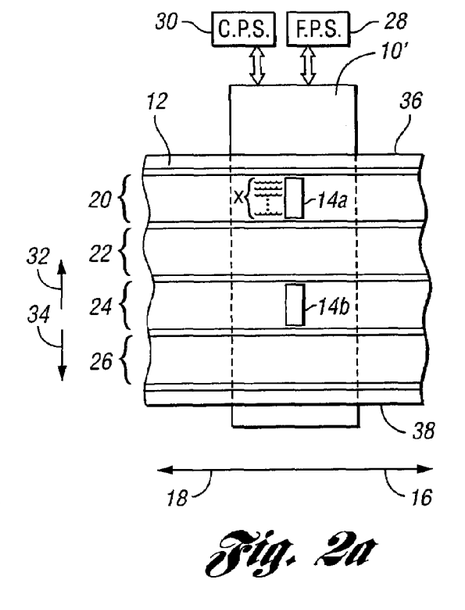
FIGS. 2a and 2b are simplified, exemplary block diagrams depicting one embodiment of the system and method described herein.
Figure 2B:
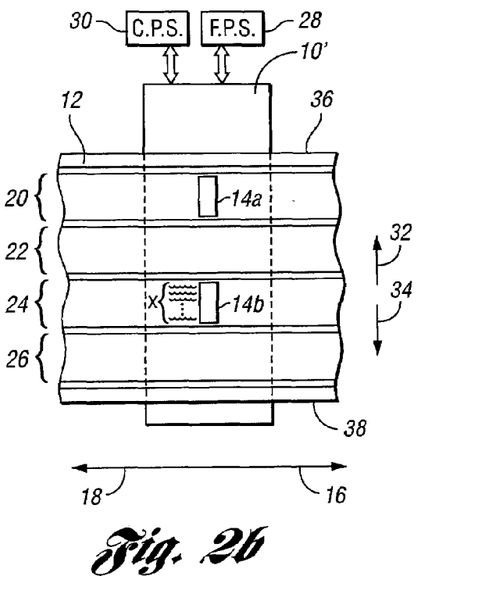

Referring now to FIGS. 2a and 2b, simplified, exemplary block diagrams depicting one embodiment of the system and method described herein are shown. As seen therein, a transducer head (10') and a magnetic tape (12) storage medium again function in a fashion well known in the art to store and retrieve information in the form of data. While shown as a magnetic tape (12) in FIGS. 2a and 2b, it should be noted that the storage medium may also take other forms known in the art.

The transducer head (10') includes first and second groups of transducer elements (14a, 14b). Once again, as is well known in the art, the first and second groups of transducer elements (14a, 14b) may include any number of individual transducer elements (not shown). Such individual transducer elements may be write elements for writing data to the magnetic tape (12). Alternatively, such individual transducer elements may be read elements for reading data from the magnetic tape (12). Each group of transducer elements (14a, 14b) may also include both read and write elements for reading data from and writing data to the magnetic tape (12). For example, each of the groups of transducer elements (14a, 14b) may be a well known "two-bump" arrangement comprising a row of 16 write elements with a parallel row of 16 read elements adjacent thereto, such that data written to the magnetic tape by a write element may be immediately read by the adjacent read element in order to check for errors. As previously noted, the transducer head (10'), including the individual transducer elements of the first and second groups of transducer elements (14a, 14b), may be fabricated by any known processes, such as, for example, thin-film deposition processes.

In order for the transducer head (10') to read data from and/or write data to the magnetic tape (12), the magnetic tape (12) moves across the transducer head (12) in either of the general directions shown by the arrows (16, 18). As the magnetic tape (12) moves in either of the directions (16, 18), the first group of transducer elements (14a) may be operated to read data from and/or write data to a set of data tracks (x) at a first band or first position (20) on the magnetic tape (12).

Once again, as is well known in the art, there are a plurality of positions on the magnetic tape (12) at which data may be read from and/or written to as the magnetic tape (12) moves relative to the transducer head (10'). As seen in FIGS. 2a and 2b, in addition to the first position (20) on magnetic tape (12), second position (22), third position (24) and fourth position (26) are shown. While FIGS. 2a and 2b depict four media positions at which data may be read from or written to the magnetic tape (12), those of ordinary skill will recognize that any number of such media positions may be provided on the magnetic tape (12) depending on a number of factors, among which are those previously noted.

In order to prevent errors in reading data from and/or writing data to the magnetic tape (12) by the first group of transducer elements (14a) of the transducer head (10'), proper alignment (e.g., azimuth and zenith) of the first group of transducer elements (14a) relative to the first position (20) on the magnetic tape (12) is required. In order to maintain proper alignment between the individual transducer elements (not shown) of the first group of transducer elements (14a) and the data tracks of the first position (20) on the magnetic tape (12), a fine positioning system (28) may be provided to effect relatively small movement of the transducer head (10'), and thus the first group of transducer elements (14a), relative to the first position (20) on the magnetic tape (12). Such movement of the transducer head (10') by the fine positioning system (28) may be in either of the general directions shown by the arrows (32, 34). The fine positioning system (28) may be any type of system known in the art for such relatively small scale movement of the transducer head (10'), such as previously noted.

In contrast to prior art transducer head positioning systems and methods, according to the embodiment of FIGS. 2a and 2b, to read data from and/or write data to a set of data tracks at a position on the magnetic tape (12) other than the first position (20), the transducer head (10') need not be moved or re-positioned relative to the magnetic tape (12). Instead, as shown in FIG. 2a, the first group of transducer elements (14a) may be operated to read data from and/or write data to data tracks at the first position (20) on the magnetic tape (12). During such operation of the first group of transducer elements (14a), the second group of transducer elements (14b) may be inactive.

Subsequently, as shown in FIG. 2b, to read data from and/or write data to data tracks at the third position (24) on the magnetic tape (12), the second group of transducer elements (14b) may be operated. During such operation of the second group of transducer elements (14b), the first group of transducer elements (14a) may be inactive. In such a fashion, data may be read from and/or written to data tracks at the first and third positions (20, 24) on the magnetic tape (12) without coarse movement or re-positioning of the transducer head (10') relative to the magnetic tape (12). It should also be noted that, alternatively, both the first and second groups of transducer elements (14a, 14b) could be activated in order to write data to and/or read data from both the first and third positions (20, 24) on the magnetic tape (12).

According to the embodiment of FIGS. 2a and 2b, data may be read from and/or written to data tracks at the second and fourth positions (22, 26) on the magnetic tape (12) by coarse re-positioning of the transducer head (10'). In order to effect such relatively large scale movement, a coarse positioning system (30) may be provided to move or re-position the transducer head (10'). Once again, as shown in FIGS. 2a and 2b, such movement of the transducer head (10') by the coarse positioning system (30) may be in either of the general directions shown by arrows (32, 34). The coarse positioning system (30) may be any type of system known in the art for such coarse positioning of the transducer head (10'), such as, for example, those previously noted.

Referring still to FIG. 2b, the coarse positioning system (30) moves the transducer head (10'), and thus the first and second groups of transducer elements (14a, 14b), relative to the magnetic tape (12). In such a fashion, the first and second groups of transducer elements (14a, 14b) are re-positioned such that the first group of transducer elements (14a) may be operated to read data from and/or write data to data tracks at the second position (22) on the magnetic tape (12), and the second group of transducer elements (14b) may be operated to read data from and/or write data to tracks at the fourth position (26) on the magnetic tape (12). To accomplish such reading of data from and/or writing of data to the second and fourth media positions (22, 26), the first and second groups of transducer elements (14a, 14b) are activated and de-activated as described above. As can be seen, with the four media positions (20, 22, 24, 26) on the magnetic tape (12) depicted in FIGS. 2a and 2b, in contrast to the prior art, the transducer head (10') of this embodiment need only be moved or re-positioned once by the coarse positioning system (30) in order for the first and second groups of transducer elements (14a, 14b) to read data from and/or write data to all of the media positions (20, 22, 24, 26). As previously described, at any media position (20, 22, 24, 26) on the magnetic tape (12), the fine positioning system (28) functions to provide relatively small scale movement or re-positioning of the transducer head (10') relative to the magnetic tape (12) in order to maintain proper alignment between the first or second group of transducer elements (14a, 14b) and the data tracks at such media positions (20, 22, 24, 26).

To further prevent errors in reading data from and/or writing data to various media positions (20, 22, 24, 26) on the magnetic tape (12), the transducer head (10') may be provided with sufficient width such that the transducer head (10') extends (in the direction of arrows (32, 34) in FIGS. 1a and 1b) beyond both edges (36, 38) of the magnetic tape (12) regardless of the position of the transducer head (10') relative to the magnetic tape (12). That is, whatever the position of the transducer head (10') effected by the coarse positioning system (30) such that the first and second groups of transducer elements (14a, 14b) may be operated to read data from and/or write data to tracks at the first and third media positions (20, 24) or the second and fourth media positions (22, 26) on the magnetic tape (12), the transducer head (10') extends beyond the edges (36, 38) of the magnetic tape (12).

In that regard, according to the embodiment of FIGS. 2a and 2b, to read data from and/or write data to all of the media positions (20, 22, 24, 26) on the magnetic tape (12), the transducer head (10') is only moved by the coarse positioning system (30) between two positions, where the travel between those positions is generally the distance between adjacent media positions (20, 22) on the magnetic tape (12). In contrast, according to the prior art positioning systems and methods of FIGS. 1a and 1b, to read data from and/or write data to all of the media positions (20, 22, 24, 26) on the magnetic tape (12), the transducer head (10) must be moved by the coarse positioning system (30) between four positions, where the maximum distance of travel is generally the distance between the outermost media positions (20, 26) on the magnetic tape (12).

As a result, in contrast to the prior art, according to the embodiment of FIGS. 2a and 2b, the width of the transducer head (10') may be reduced to a width that more closely approaches the width of the magnetic tape. Such a reduction in the width of the transducer head (10') can provide a cost savings by reducing the amount of material needed to construct the transducer head (10'). Such a reduction in material also lowers the actuated mass of the transducer head (10'), which can simplify the design of the fine and coarse positioning systems (28, 30), and can provide for faster, more accurate movement of the transducer head (10') by those systems (28, 30). While not required, the embodiment of FIGS. 2a and 2b thus may provide for a reduction in coarse movement requirements, may increase system reliability, may decrease positioning system sub-assembly costs and size, may reduce positioning (e.g., azimuth and zenith) variations and failures, and may increase read/write integrity.

Figure 3:
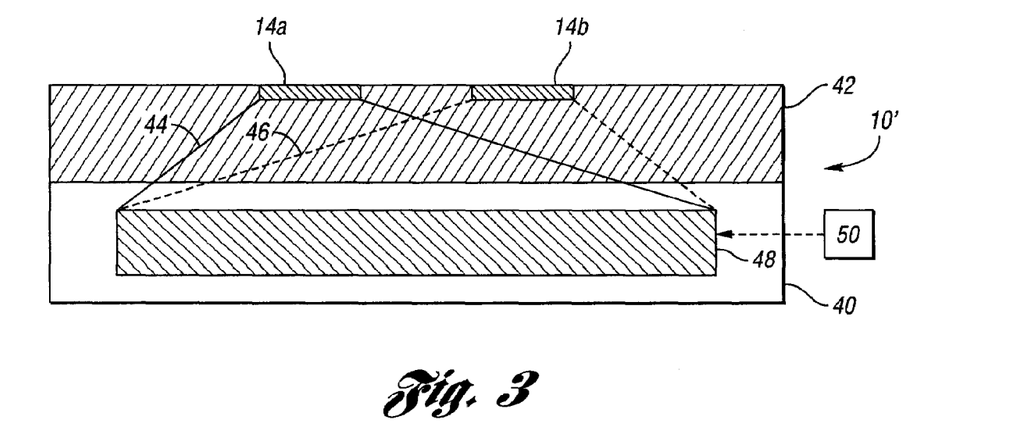
FIG. 3 is a simplified, exemplary block diagram of a transducer head for use in one embodiment of the system and method described herein.

Referring next to FIG. 3, a simplified, exemplary block diagram of a transducer head for use in one embodiment of the system and method described herein is shown. As seen therein, and as is well known in the art, the transducer head (10') includes a substrate (40) and a closure piece (42). The transducer head (10') also includes first and second groups of transducer elements (14a, 14b). Exemplary paths (44, 46) are shown for electrical traces (not shown) that extend from each of the individual transducer elements (not shown) in the first and second groups of transducer elements (14a, 14b) through the transducer head (10') and terminate at a pad (48) on the transducer head (10'). It should be noted that, like the transducer head (10') and the individual transducer elements of the first and second groups of transducer elements (14a, 14b), such electrical traces may be fabricated by any known processes, such as, for example, thin-film deposition processes. The pad (48) provides a terminal for connecting an electrical cable (not shown), such as a flat flex cable, to the transducer head (10') in order to provide electrical power to the individual transducer elements in the first and second groups of transducer elements (14a, 14b).

In order to operate the first or second group of transducer elements (14a, 14b) to read data from and/or write data to the various media positions (20, 22, 24, 26) on the magnetic tape (12) in the fashion previously described, a device (50) may be provided for supplying electrical power to the first and second groups of transducer elements (14a, 14b). For example, the device (50) may be a switching device and may switch on the first group of transducer elements (14a) and switch off the second group of transducer elements (14b), such that data may be read from and/or written to data tracks at the first position (20) on the magnetic tape (12). The device (50) may also switch on the second group of transducer elements (14b) and switch off the first group of transducer elements (14a), such that data may be read from and/or written to data tracks at the third position (24) on the magnetic tape (12). It should be noted, however, that the device (50) may be any type of device known in the art, and may alternatively be operated such that both the first and second groups of transducer elements (14*a*, 14*b*) are activated in order to write data to and/or read data from both the first and third positions (20, 24) on the magnetic tape (12).

As shown, the device (50) may be external to the transducer head (10'). Where the device (50) is provided external to the transducer head (10'), an electrical cable connected to the pad (48) of the transducer head (10') would include one or more conductors for each of the individual transducer elements of both the first and second groups of transducer elements (14*a*, 14*b*). Alternatively, the device (50) may be part of or integrated into the transducer head (10'), such as a solid state device which may be fabricated according to any known processes, such as, for example, thin-film deposition processes. Where the device (50) is provided as part of the transducer head (10'), an electrical cable connected to the pad (48) of the transducer head (10') would include one or more conductors for each of the individual transducer elements of one of the first or second groups of transducer elements (14*a*, 14*b*), thereby reducing transducer head input/output.

Figure 4A:
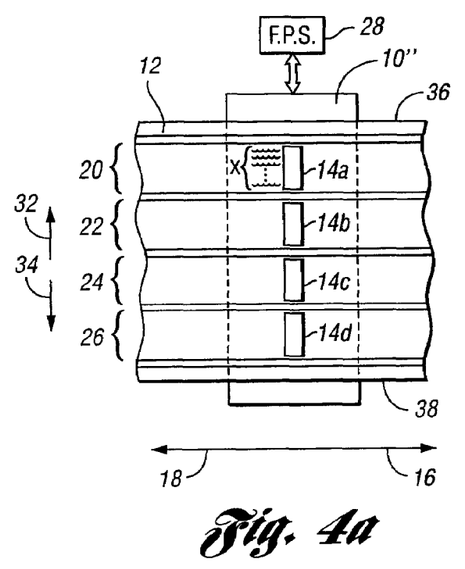
FIGS. 4a and 4b are simplified, exemplary block diagrams depicting another embodiment of the system and method described herein.
Figure 4B:
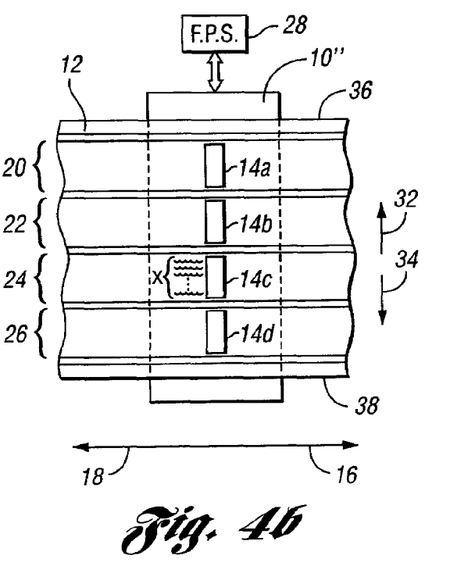

Referring now to FIGS. 4*a* and 4*b*, simplified, exemplary block diagrams depicting another embodiment of the system and method described herein are shown. As seen therein, a transducer head (10") and a magnetic tape (12) storage medium again function in a fashion well known in the art to store and retrieve information in the form of data. While shown as a magnetic tape (12) in FIGS. 4*a* and 4*b*, it should be noted that the storage medium may also take other forms known in the art.

The transducer head (10") includes first, second, third and fourth groups of transducer elements (14*a*, 14*b*, 14*c*, 14*d*). Once again, as is well known in the art, the first, second, third and fourth groups of transducer elements (14*a*, 14*b*, 14*c*, 14*d*) may include any number of individual transducer elements (not shown). Such individual transducer elements may be write elements for writing data to the magnetic tape (12). Alternatively, such individual transducer elements may be read elements for reading data from the magnetic tape (12). Each group of transducer elements (14*a*, 14*b*, 14*c*, 14*d*) may also include both read and write elements for reading data from and writing data to the magnetic tape (12). For example, each of the groups of transducer elements (14*a*, 14*b*, 14*c*, 14*d*) may be a well known "two-bump" arrangement comprising a row of 16 write elements with a parallel row of 16 read elements adjacent thereto, such that data written to the magnetic tape by a write element may be immediately read by the adjacent read element in order to check for errors. As previously noted, the transducer head (10"), including the individual transducer elements of the first, second, third and fourth groups of transducer elements (14*a*, 14*b*, 14*c*, 14*d*), may be fabricated by any known processes, such as, for example, thin-film deposition processes.

In order for the transducer head (10") to read data from and/or write data to the magnetic tape (12), the magnetic tape (12) moves across the transducer head (10") in either of the general directions shown by the arrows (16, 18). As the magnetic tape (12) moves in either of the directions (16, 18), the first group of transducer elements (14*a*) may be operated to read data from and/or write data to a set of data tracks (x) at a first band or first position (20) on the magnetic tape (12).

Once again, as is well known in the art, there are a plurality of positions on the magnetic tape (12) at which data may be read from and/or written to as the magnetic tape (12) moves relative to the transducer head (10"). As seen in FIGS. 4*a* and 4*b*, in addition to the first position (20) on magnetic tape (12), second position (22), third position (24) and fourth position (26) are shown. While FIGS. 4*a* and 4*b* depict four media positions at which data may be read from or written to the magnetic tape (12), those of ordinary skill will recognize that any number of such media positions may be provided on the magnetic tape (12) depending on a number of factors, among which are those previously noted.

In order to prevent errors in reading data from and/or writing data to the magnetic tape (12) by the first group of transducer elements (14*a*) of the transducer head (10"), proper alignment (e.g., azimuth and zenith) of the first group of transducer elements (14*a*) relative to the first position (20) on the magnetic tape (12) is required. In order to maintain proper alignment between the individual transducer elements (not shown) of the first group of transducer elements (14*a*) and the data tracks of the first position (20) on the magnetic tape (12), a fine positioning system (28) may be provided to effect relatively small movement of the transducer head (10"), and thus the first group of transducer elements (14*a*), relative to the first position (20) on the magnetic tape (12). Such movement of the transducer head (10") by the fine positioning system (28) may be in either of the general directions shown by the arrows (32, 34). The fine positioning system (28) may be any type of system known in the art for such relatively small scale movement of the transducer head (10"), such as previously noted.

In contrast to prior art transducer head positioning systems and methods, according to the embodiment of FIGS. 4*a* and 4*b*, to read data from and/or write data to a set of data tracks at a position on the magnetic tape (12) other than the first position (20), the transducer head (10") need not be moved or re-positioned relative to the magnetic tape (12). Instead, as shown in FIG. 4*a*, the first group of transducer elements (14*a*) may be operated to read data from and/or write data to data tracks at the first position (20) on the magnetic tape (12). During such operation of the first group of transducer elements (14*a*), the second, third and fourth groups of transducer elements (14*b*, 14*c*, 14*d*) may be inactive.

Subsequently, as shown in FIG. 4*b*, to read data from and/or write data to data tracks at the third position (24) on the magnetic tape (12), the third group of transducer elements (14*c*) may be operated. During such operation of the third group of transducer elements (14*c*), the first, second and fourth groups of transducer elements (14*a*, 14*b*, 14*d*) may be inactive. Similarly, to read data from and/or write data to data tracks at the second position (22) on the magnetic tape (12), the second group of transducer elements (14*b*) may be operated. During such operation of the second group of transducer elements (14*b*), the first, third and fourth groups of transducer elements (14*a*, 14*c*, 14*d*) may be inactive. To read data from and/or write data to data tracks at the fourth position (26) on the magnetic tape (12), the fourth group of transducer elements (14*d*) may be operated. During such operation of the fourth group of transducer elements (14*d*), the first, second and third groups of transducer elements (14*a*, 14*b*, 14*c*) may be inactive. It should be also be noted that, alternatively, two or more of the first, second, third and fourth groups of transducer elements (14*a*, 14*b*, 14*c*, 14*d*) could be activated in order to write data to and/or read data from two or more of the first, second, third and fourth positions (20, 22, 24, 26) on the magnetic tape (12).

In such a fashion, data may be read from and/or written to data tracks at the first, second, third and fourth positions (20, 22, 24, 26) on the magnetic tape (12) without coarse movement or re-positioning of the transducer head (10") relative to the magnetic tape (12). That is, with the four groups of transducer elements (14*a*, 14*b*, 14*c*, 14*d*) and the four media positions (20, 22, 24, 26) depicted in FIGS. 4*a* and 4*b*, in contrast to the prior art, the transducer head (10") of this embodiment need not moved or re-positioned in order for data to be read from or written to all of the media positions (20, 22, 24, 26). As a result, a course positioning system need not be provided. Once again, during operation of the any group of transducer elements (14a, 14b, 14c, 14d) to read data from and/or write data to any media position (20, 22, 24, 26) on the magnetic tape (12), the fine positioning system (28) functions to provide relatively small scale movement or re-positioning of the transducer head (10") relative to the magnetic tape (12) in order to maintain proper alignment between the group of transducer elements (14a, 14b, 14c, 14d) and the data tracks at the media positions (20, 22, 24, 26).

To further prevent errors in reading data from and/or writing data to various media positions (20, 22, 24, 26) on the magnetic tape (12), the transducer head (10") may be provided with sufficient width such that the transducer head (10") extends (in the direction of arrows (32, 34) in FIGS. 4a and 4b) beyond both edges (36, 38) of the magnetic tape (12). In that regard, according to the embodiment of FIGS. 4a and 4b, to read data from and/or write data to all of the media positions (20, 22, 24, 26) on the magnetic tape (12), the transducer head (10") need not be re-positioned by any course travel or large scale movement of the transducer head (10"). In contrast, according to the prior art positioning systems and methods of FIGS. 1a and 1b, to read data from and/or write data to all of the media positions (20, 22, 24, 26) on the magnetic tape (12), the transducer head (10) must be moved by the coarse positioning system (30) between four positions, with a maximum distance of travel equal to the distance between the outermost media positions (20, 26) on the magnetic tape (12).

As a result, in contrast to the prior art, according to the embodiment of FIGS. 4a and 4b, the width of the transducer head (10") may be reduced to a width only marginally greater than the width of the magnetic tape. Such a reduction in the width of the transducer head (10") can provide a cost savings by reducing the amount of material needed to construct the transducer head (10"). Such a reduction in material also lowers the actuated mass of the transducer head (10"), which can simplify the design of the fine positioning system (28), and which can provide for faster, more accurate movement of the transducer head (10") by that system (28). While not required, the embodiment of FIGS. 4a and 4b thus may provide for elimination of coarse movement requirements, may increase system reliability, may decrease positioning system sub-assembly costs and size, may reduce positioning (e.g., azimuth and zenith) variations and failures, and may increase read/write integrity.

In order to operate the first, second, third or fourth group of transducer elements (14a, 14b, 14c, 14d) to read data from and/or write data to the various media positions (20, 22, 24, 26) on the magnetic tape (12) in the fashion previously described, multiple electrical trace paths, multiple traces, a pad (48), and a device (50) may be provided as described above in connection with FIG. 3. The device (50) may be external to the transducer head (10"), or may be part of or integrated into the transducer head (10"), such as a solid state device. Where the device (50) is provided external to the transducer head (10"), an electrical cable connected to the pad (48) of the transducer head (10") would include one or more conductors for each of the individual transducer elements of all of the first, second, third and fourth groups of transducer elements (14a, 14b, 14c, 14d). Where the device (50) is provided as part of the transducer head (10"), an electrical cable connected to the pad (48) of the transducer head (10") would include one or more conductors for each of the individual transducer elements of one of the first, second, third or fourth groups of transducer elements (14a, 14b, 14c, 14d), thereby reducing transducer head input/output.

Figure 5:
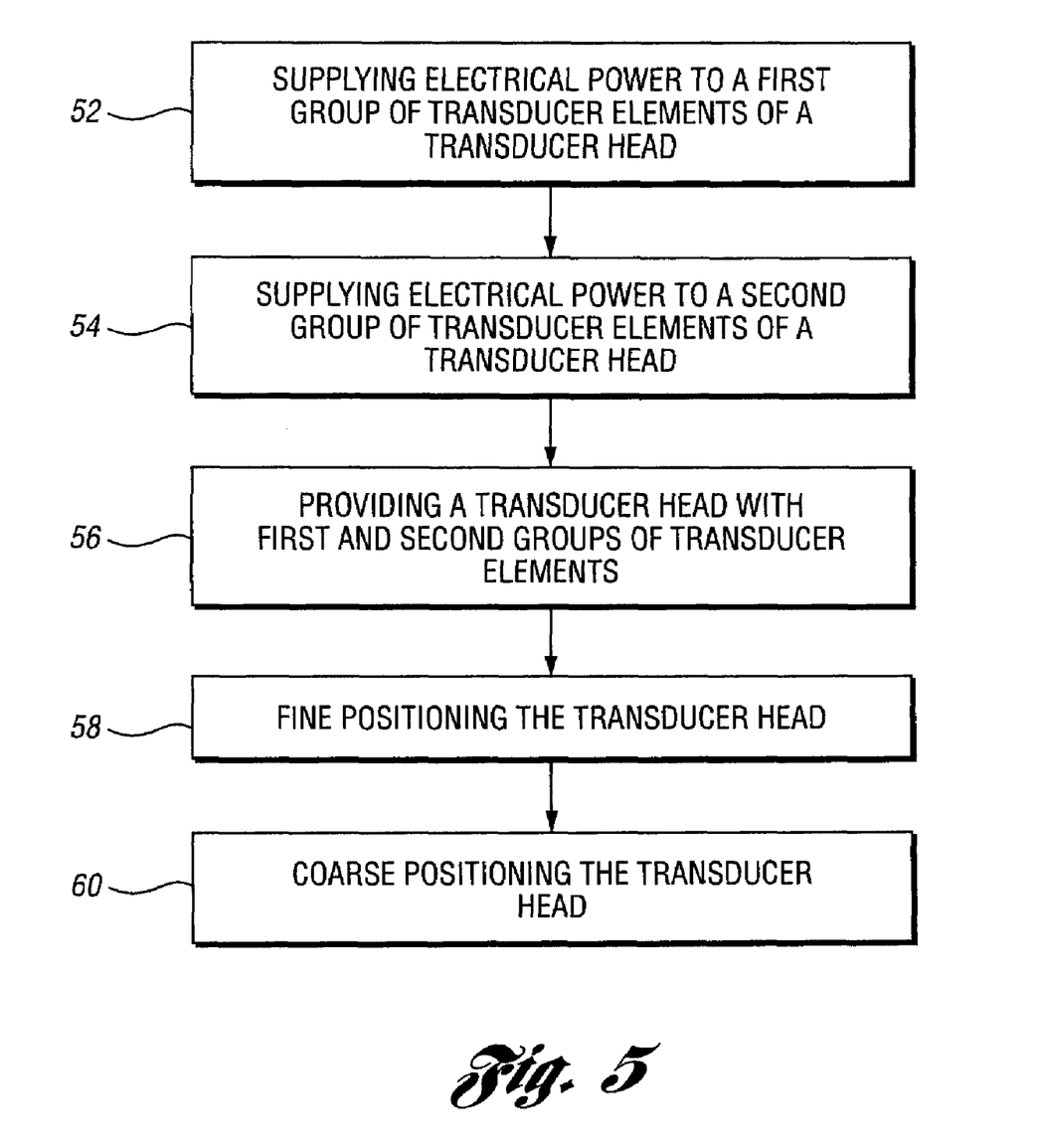
FIG. 5 is a simplified, exemplary flowchart depicting one embodiment of the method described herein.

Referring now to FIG. 5, a simplified, exemplary flowchart depicting one embodiment of the method described herein is shown. As seen therein, the method may comprise supplying (52) electrical power to a first group of transducer elements of a transducer head to read data from or write data to a first set of tracks on a storage medium, and supplying (54) electrical power to a second group of transducer elements to read data from or write data to a second set of tracks on the storage medium different than the first set of tracks without relatively large scale movement of the transducer head relative to the storage medium.

The method may further comprise providing (56) the transducer head, and fine positioning (58) of the transducer head relative to the storage medium as described in greater detail above. The method may still further comprise, as also described in greater detail above, coarse positioning (60) of the transducer head relative to the storage medium, such that the first group of transducer elements is positioned to read data from or write data to a third set of tracks on the storage medium different than the first and second sets of tracks, and the second group of transducer elements is positioned to read data from or write data to a fourth set of tracks on the storage medium different than the first, second and third sets of tracks.

It should be noted that the method of FIG. 5 as shown and described herein is exemplary only, and that the functions or steps of the method could be undertaken other than in the order described and/or simultaneously as may be desired, permitted and/or possible.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transducer head positioning system comprising:
 a transducer head comprising
  a first plurality of elements for reading data from or writing data to a set of tracks on a storage medium, and
  a second plurality of elements for reading data from or writing data to a set of tracks on a storage medium, and
 a device for supplying electrical power to the first plurality of elements to read data from or write data to a first position on the storage medium, and for supplying electrical power to the second plurality of elements to read data from or write data to a second position on the storage medium different than the first position without coarse movement of the transducer head relative to the storage medium, wherein the device for supplying electrical power is integrated into the transducer head.

2. The system of claim 1 further comprising a system for fine movement of the transducer head relative to the storage medium.

3. The system of claim 1 further comprising a system for coarse movement of the transducer head relative to the storage medium, wherein the first plurality of elements is positioned by the coarse movement system to read data from or write data to a third position on the storage medium different than the first and second positions, and the second plurality of elements is positioned by the coarse movement system to read data from or write data to a fourth position on the storage medium different than the first, second and third positions.

4. The system of claim 3 further comprising a system for fine movement of the transducer head relative to the storage medium.

5. The system of claim 1 wherein the device for supplying electrical power comprises a solid state device.

6. The system of claim 1 wherein the storage medium comprises a magnetic tape.

7. The system of claim 1 wherein the transducer head further comprises a connection portion for use in connecting the transducer head to a cable for providing electrical power, the connection portion comprising a conductor for each of the elements of both of the first and second plurality of elements.

8. The system of claim 1 wherein the transducer head further comprises a connection portion for use in connecting the transducer head to a cable for providing electrical power, the connection portion comprising a conductor for each of the elements of one of the first and second plurality of elements.

9. A transducer head positioning method comprising:
supplying electrical power to a first plurality of elements of a transducer head so that the first plurality of elements read data from or write data to a first set of tracks on a storage medium; and
supplying electrical power to a second plurality of elements of the transducer head so that the second plurality of elements read data from or write data to a second set of tracks on the storage medium different than the first set of tracks without gross movement of the transducer head relative to the storage medium, wherein supplying electrical power includes providing a solid-state device integrated into the transducer head.

10. The method of claim 9 further comprising providing the transducer head, the transducer head comprising a first element group comprising the first plurality of elements for reading data from or writing data to a set of tracks on the storage medium, and a second element group comprising the second plurality of elements for reading data from or writing data to a set of tracks on the storage medium wherein.

11. The method of claim 9 further comprising fine positioning of the transducer head relative to the storage medium.

12. The method of claim 11 further comprising gross positioning of the transducer head relative to the storage medium, such that the first plurality of elements is positioned to read data from or write data to a third set of tracks on the storage medium different than the first and second sets of tracks, and the second plurality of elements is positioned to read data from or write data to a fourth set of tracks on the storage medium different than the first, second and third sets of tracks.

13. The method of claim 9 wherein the storage medium comprises a magnetic tape.

14. A transducer head positioning system for use with a storage medium comprising a plurality of storage positions, the transducer head positioning system comprising:
a transducer head comprising a plurality of element groups, each transducer element group comprising a plurality of elements for reading data from or writing data to one of the plurality of storage position on the storage medium, wherein the plurality of element groups equals the plurality of storage positions on the storage medium; and
a switching device for switching electrical power between the plurality of element groups so that the plurality of elements read data from or write data to each of the plurality of storage positions on the storage medium without coarse movement of the transducer head relative to the storage medium, wherein the switching device is integrated into the transducer head.

15. The system of claim 14 further comprising a system for fine movement of the transducer head relative to the storage medium.

16. The system of claim 14 wherein the storage medium comprises a magnetic tape.

17. The system of claim 14 further comprising a system for coarse movement of the transducer head relative to the storage medium, wherein the first plurality of elements is positioned by the coarse movement system to read data from or write data to a third position on the storage medium different than the first and second positions, and the second plurality of elements is positioned by the coarse movement system to read data from or write data to a fourth position on the storage medium different than the first, second and third positions.

18. The system of claim 17 further comprising a system for fine movement of the transducer head relative to the storage medium.

19. The system of claim 14 wherein the device for supplying electrical power comprises a solid state device.

20. The system of claim 14 wherein the transducer head further comprises a connection portion for use in connecting the transducer head to a cable for providing electrical power, the connection portion comprising a conductor for each of the elements of one of the first and second plurality of elements.

* * * * *

UNITED STATES PATENT AND TRADEMARK OFFICE
CERTIFICATE OF CORRECTION

PATENT NO. : 7,646,558 B2  Page 1 of 1
APPLICATION NO. : 11/625927
DATED : January 12, 2010
INVENTOR(S) : Darryl W. Yeakley et al.

It is certified that error appears in the above-identified patent and that said Letters Patent is hereby corrected as shown below:

Column 11, Line 38, Claim 10:

After "storage medium" delete "wherein".

Column 12, Line 12, Claim 14:

After "storage" delete "position" and insert -- positions --.

Signed and Sealed this

Fourth Day of May, 2010

David J. Kappos
*Director of the United States Patent and Trademark Office*